(12) United States Patent
Cen et al.

(10) Patent No.: US 7,600,078 B1
(45) Date of Patent: Oct. 6, 2009

(54) SPECULATIVELY PERFORMING READ TRANSACTIONS

(75) Inventors: Ling Cen, Austin, TX (US); Vishal Moondhra, Bangalore (IN); Tessil Thomas, Benson Town (IN)

(73) Assignee: Intel Corporation, Santa Clara, CA (US)

( * ) Notice: Subject to any disclaimer, the term of this patent is extended or adjusted under 35 U.S.C. 154(b) by 517 days.

(21) Appl. No.: 11/392,335

(22) Filed: Mar. 29, 2006

(51) Int. Cl.
*G06F 12/00* (2006.01)
(52) U.S. Cl. ............... 711/137; 711/138; 711/141; 711/167
(58) Field of Classification Search ......... 711/137–138, 711/141, 167
See application file for complete search history.

(56) References Cited

U.S. PATENT DOCUMENTS

| | | | |
|---|---|---|---|
| 6,009,488 A | 12/1999 | Kavipurapu | 710/105 |
| 6,993,633 B1 * | 1/2006 | Sakakibara et al. | 711/146 |
| 2002/0087811 A1 * | 7/2002 | Khare et al. | 711/146 |
| 2004/0044850 A1 * | 3/2004 | George et al. | 711/131 |
| 2005/0240734 A1 | 10/2005 | Batson et al. | 711/141 |

OTHER PUBLICATIONS

U.S. Appl. No. 10/833,963, filed Apr. 27, 2004, entitled "A Two-Hop Cache Coherency Protocol" by Ling Cen.

* cited by examiner

*Primary Examiner*—Jasmine Song
(74) *Attorney, Agent, or Firm*—Trop, Pruner & Hu, P.C.

(57) ABSTRACT

In one embodiment, the present invention includes a method for speculatively providing a read request to a memory controller associated with a processor, determining coherency of the read request in parallel with obtaining data of the speculatively provided read request, and providing the data of the speculatively provided read request to the processor if the read request is coherent. In this way, data may be used by a processor with a reduced latency. Other embodiments are described and claimed.

8 Claims, 8 Drawing Sheets

SPECULATIVELY PERFORMING READ TRANSACTIONS

BACKGROUND

Embodiments of the present invention relate to operation of a processor, and more particularly to obtaining data for use in a processor.

When data needed for a processor operation is not present in the processor, a latency, which is the time it takes to load the data into the processor, occurs. Such a latency may be low or high, depending on where the data is obtained from within various levels of a memory hierarchy. Accordingly, prefetching schemes are used to generate and transmit prefetch requests corresponding to data or instructions that are predicted to be needed by a processor in the near future. When the prediction is correct and data is readily available to an execution unit, latencies are reduced and increased performance is achieved. Prefetching schemes are typically based on a prediction of data locations to be accessed based on the location of current read requests.

In addition to a latency incurred in requesting data from a remote location (e.g., memory, mass storage or the like), in many systems a processor socket may have its own latency associated with accessing data from within or outside the processor socket. These delays, which are applicable both to actual read requests as well as prefetch requests generated in the processor socket, can be associated with delays in routing and coherency determinations. For example, in systems implementing a point-to-point (PTP) interconnect system, a coherency protocol may be established such that a processor socket first determines whether a request (i.e., actual or prefetch) corresponds to a coherent memory location prior to sending the request from the processor socket. Such delays within a processor socket can incur a significant amount of cycles before a request is even sent out of the processor socket. For example, it may take 100 or more cycles before routing and coherency determinations are made and a request is ready to be transmitted from a processor socket. Such delays negatively affect performance.

DETAILED DESCRIPTION

In various embodiments, a best-case memory read latency in a processor having an integrated memory controller may be reduced. More specifically, a so-called speculative prefetch may pass a requested address directly to the memory controller that is associated with the memory location corresponding to requested address. In this way, the memory access and coherency state resolution for the location that is being read may occur in parallel. Once the coherency state for the read transaction address has been resolved by a coherence controller, the actual read request is issued to the memory controller. By this time, the speculative prefetch read may already be inflight. Data obtained for the prefetch read may be provided as the data for the actual or real read request, thereby reducing latency. If the coherence controller decides not to issue the real request (e.g., in the case that the latest copy of the data in the requested address location does not exist in the memory), the speculatively prefetched read request (and data if obtained) may be discarded.

Figure 1:
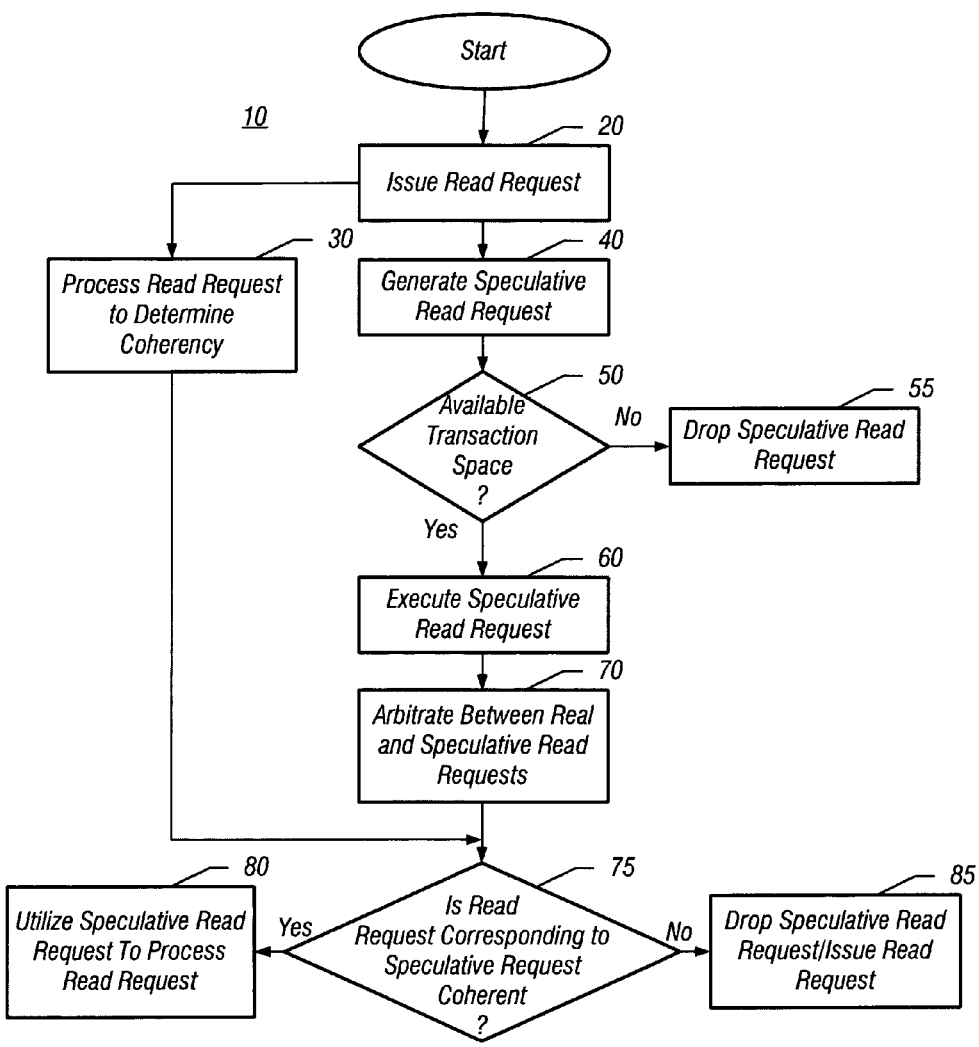
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be used to perform speculative read requests, which may reduce latency in obtaining data from a remote location. Method 10 may be implemented in a processor socket, and more particularly a processor socket in a system including one or more processor sockets, associated memories and other agents, such as hub agents and the like.

Method 10 may begin by issuing a read request (block 20). This read request is an actual read request for information needed by a core. As one example, a core of a processor socket may issue a read request when desired data is not present in a cache associated with the core. Furthermore, in some implementations a cache controller of the core may further determine that the data is not present in local caches of other cores of the processor socket. Accordingly, the core issues the read request. Next, the read request is processed to determine its coherency (block 30). For example, other logic within the processor socket may determine whether the request is for a location that is coherent. In one embodiment, a coherence controller may be used to determine coherency.

Still referring to FIG. 1, in parallel with the coherency determination, a speculative read request may be generated (block 40). Such a speculative read request may be directly provided to a memory controller for transmission as a transaction with much less latency than an actual (i.e., real) read request. Next, it may be determined whether available transaction space is present (diamond 50). In some implementations, the determination of available transaction space also may be made in parallel with the coherency determination. In some implementations, the availability of transaction space may correspond to a determination of whether available resources, e.g., of a memory controller, are able to handle additional transactions. That is, if the memory controller is not fully loaded, speculative transactions may be issued to obtain requested data with lower latency. In some embodiments, the determination of available transaction space may be based on a transaction level of the memory controller, and further, this transaction level may be compared to a threshold. If no transaction space is available, the real (i.e., actual) request may be executed normally (described further below) and accordingly, a significant latency may occur prior to the time that the data is available for use by the requesting core.

Note that this read request may take many cycles to even be issued out of the processor socket, as a significant latency (e.g., as measured by processor cycles) may occur in various logic between the requesting core and the memory controller. For example, various interface logic, caching logic, routing activities and coherency determinations may occur before the read request is provided to the memory controller for transmission from the processor socket as a transaction.

Accordingly, in various embodiments if it is determined at diamond 50 that available transaction space exists, control may pass to block 60. There, a speculative read request may be executed (block 60). Thus, the speculative request may be executed (i.e., issued) by the memory controller to obtain data from the desired location corresponding to the speculative request. From block 60, control passes to block 70, where arbitration between real and speculative read requests may occur (block 70). Accordingly, a memory controller or other such component may arbitrate between actual memory requests and speculative memory requests in issuing various requests out to memory. If instead at diamond 50 it is determined that there is no transaction space available, the speculative read request may be dropped (block 55).

Still referring to FIG. 1, next control passes to diamond 75 from block 70. There, it may finally be determined whether the actual read request (issued in block 20) is coherent (diamond 75). If it is determined that the read request is coherent, control passes to block 80, where the speculative read request may be utilized to process the read request (block 80). Because this speculative read request issued as a transaction from the processor socket, likely many cycles prior to the determination of whether the read request was coherent, the requested data may already have been provided back to the processor socket, or may be inflight. Accordingly, by sending speculative read requests, reduced latencies are possible.

If instead at diamond 75 it is determined that the read request corresponding to the previously generated speculative request is not coherent, control passes to block 85. There, the speculative read request is dropped and the actual read request is issued out to memory (block 85). Accordingly, because the read request was incoherent, the previously issued speculative request seeks stale data and so the request is dropped to avoid use of that data. While described with this particular implementation in the embodiment of FIG. 1, it is to be understood that the scope of the present invention is not so limited.

Figure 2:
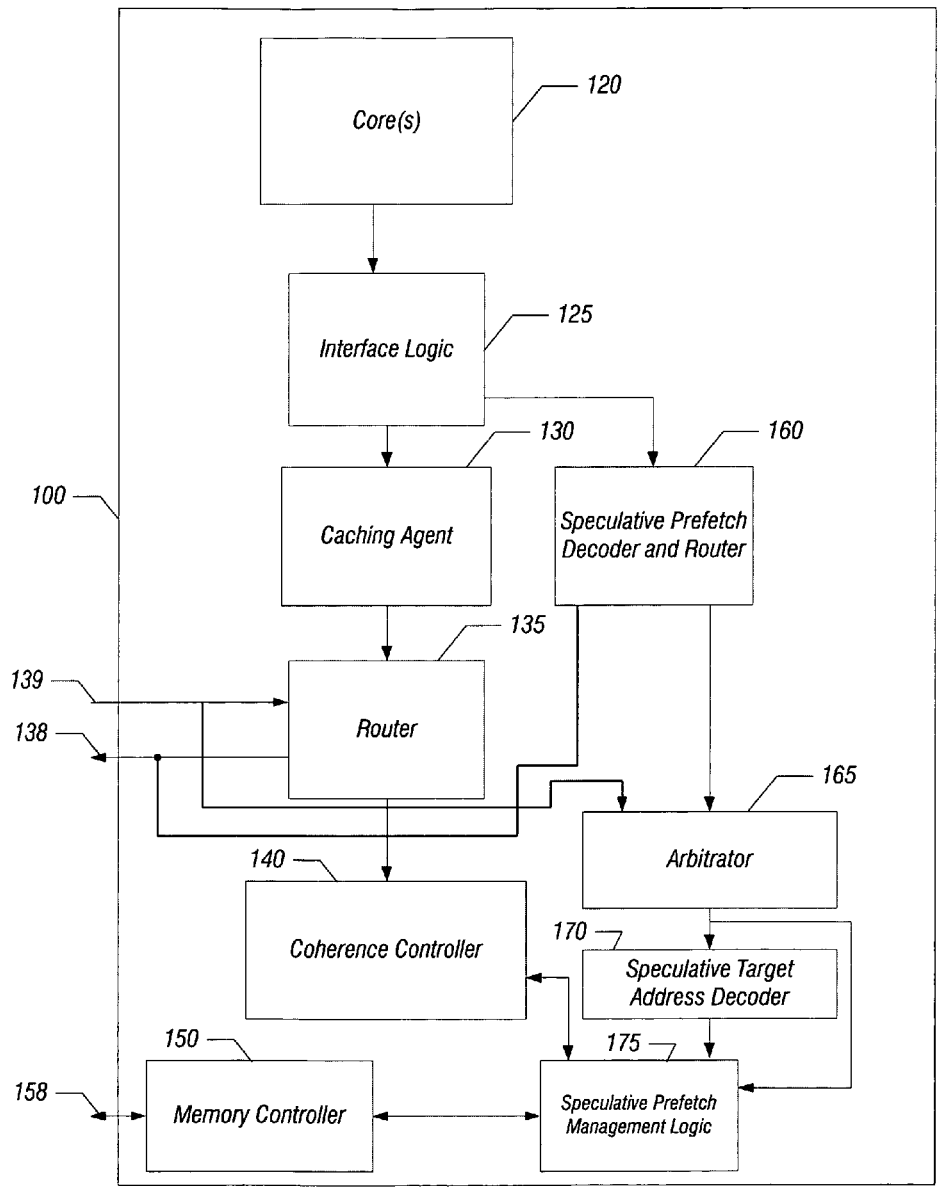
FIG. 2 is a block diagram of a processor socket in accordance with one embodiment of the present invention.

In some embodiments, a processor socket including one or more processor cores and additional logic, controllers, and the like may be used to perform speculative read requests in accordance with an embodiment of the present invention. Referring now to FIG. 2, shown is a block diagram of a processor socket in accordance with one embodiment of the present invention. As shown in FIG. 2, processor socket 100 includes one or more cores 120. For purposes of discussion, it may be assumed that multiple cores 120 are present. Each core may include its own local cache memory, along with a local cache controller. Additionally, cores 120 may further include a global cache controller, in some embodiments. Accordingly, when a given core 120 seeks data, it may first be determined whether the requested data is present in its own local cache or a cache within the plurality of cores. If the requested data is present in one of the cores, the data may be provided to the requesting core without further involvement of additional logic within processor socket 100.

If instead a read request seeks data that is not present in one of cores 120, a read request is issued to an interface logic 125. In various embodiments, interface logic 125 may be used to interface messages or other transactions between cores 120 and a fabric to which processor socket 100 is coupled. Furthermore, interface logic 125 may generate a speculative prefetch request corresponding to the actual read request. Thus as shown in FIG. 2, a coherent path request is issued from interface logic 125 to a caching agent 130 along a coherent path, while a speculative prefetch request is issued from interface logic 125 to a speculative prefetch decoder and router (hereafter speculative router) 160 along a speculative path.

Coherent path requests may be processed in caching agent 130, which may be used to generate and control snoop traffic. From caching agent 130 these coherent path requests corresponding to actual read requests are sent to a router 135. Router 135 may determine based on information (e.g., address information) associated with a request whether the request is directed to a location within processor socket 100 or an off-chip location. Accordingly, router 135 passes the request either to a coherence controller 140 or off-chip via an interconnect 138. In various embodiments, interconnect 138 may be a point-to-point interconnect, although the scope of the present invention is not so limited. Interconnect 138 may be coupled to various entities, for example, a remote processor socket or another agent.

Coherence controller 140 may receive coherent path requests that are received from either cores 120 of processor socket 100 or from remote agents. Coherence controller 140 may be used to determine whether the coherent path request is for a coherent piece of data, in other words a data location that is not invalid or dirty. Based on the determination in coherence controller 140, coherent path requests are provided to a memory controller 150. Memory controller 150 may have a set of read-write data buffers (not shown in FIG. 2). Some of the available read-write buffers can be reserved for speculative prefetch requests. The address of every read or write transaction (speculative or real) issued in memory controller 150 may be written into an inflight transaction address control addressable memory (ITA CAM) and transaction related state may be written into an inflight transaction state (ITS) table. There may be one entry in the ITA CAM and the ITS table corresponding to each read-write buffer. The transaction is tracked inside memory controller 150 using the address (i.e., transaction identifier or "transaction ID") of the read-write buffer.

In the embodiment of FIG. 2, coherent path requests may pass through a speculative prefetch management logic 175, which will be discussed further below. Memory controller 150 may be used to control transactions between processor socket 100 and one or more memories coupled thereto, e.g., via an interconnect 158. For example, a portion of system memory may be locally attached to processor socket 100 via interconnect 158.

Still referring to FIG. 2, speculative prefetch requests are provided along a speculative path to speculative router 160. Speculative router 160 may decode a source address corresponding to the read request and route it accordingly. That is, if the request is for a source address outside of processor socket 100, speculative router 160 may transmit the request to other entities of the system via interconnect 138. Note that the path from speculative router 160 to off-chip may bypass router 135, significantly reducing latency associated with the speculative request.

If instead speculative router 160 determines that the requested data is present within processor socket 100 or a portion of distributed memory coupled thereto, the prefetch request may be provided to an arbitrator 165, which receives local socket speculative prefetch requests from speculative router 160. Furthermore, arbitrator 165 receives incoming speculative requests from remote sockets, e.g., via an interconnect 139, which may be a point-to-point interconnect in some embodiments. Accordingly, arbitrator 165 arbitrates between remote and local speculative prefetch requests, e.g., based on availability of resources. The winning request is provided to a speculative target address decoder 170, which decodes the target address of the speculative request. Note that the speculative transaction may also be provided directly to speculative prefetch management logic (hereafter speculative prefetch logic) 175 directly from arbitrator 165. This early indication may be used to inform speculative prefetch logic 175 of the impending transaction in an effort to clear speculative prefetch logic 175 of pending work.

When decoded, the speculative request is sent from speculative target address decoder 170 to speculative prefetch logic 175. There, based on a level of coherent path requests, also provided to speculative prefetch management logic 175, prefetch requests may be passed along to memory controller 150 for appropriate handling. In various embodiments, if the resources of processor socket 100 are consumed by coherent path requests (i.e., actual requests), speculative prefetch logic 175 may drop speculative requests. However, when available capacity is present, speculative prefetch logic 175 may pass along speculative prefetch requests to memory controller 150. In this way, the significantly reduced latency of speculative prefetches may be realized such that when an actual read request corresponding to the speculative read request is later received in memory controller 150, the requested data may already be present, or may be inflight pursuant to the earlier speculative prefetch request. While described with this particular implementation in the embodiment of FIG. 2, it is to be understood that the scope of present invention is not limited in this regard and implementation of speculative prefetches may vary in different embodiments.

Figure 3:
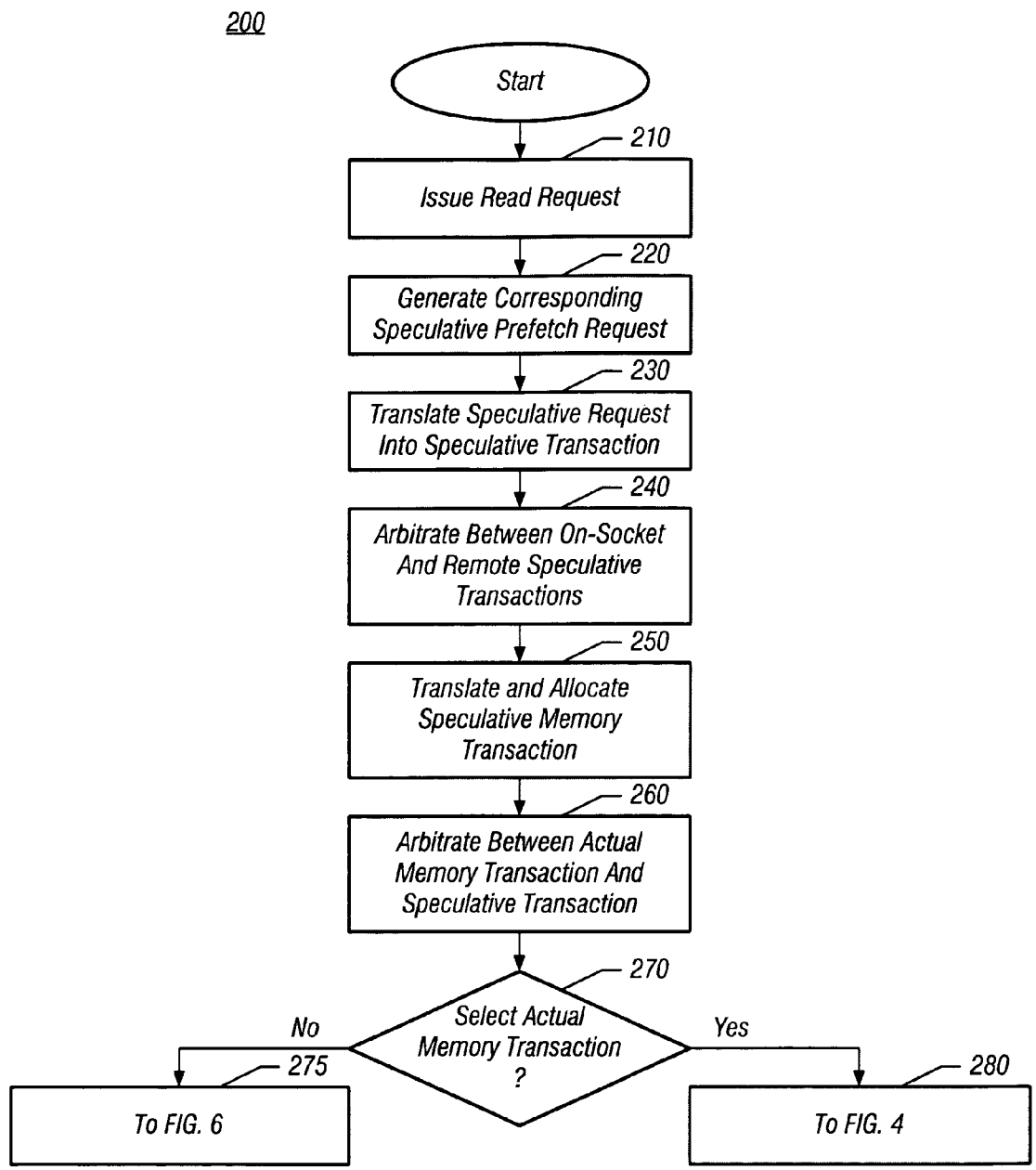
FIG. 3 is a flow diagram of a method of generating speculative read transactions in accordance with one embodiment of the present invention.

Referring now to FIG. 3, shown is a flow diagram of a method of generating speculative read transactions in accordance with one embodiment of the present invention. As shown in FIG. 3, method 200 may begin by issuing a read request (block 210). Such a read request may be issued by a core of a processor socket. Then a corresponding speculative prefetch request for this issued read request may be generated (block 220). The speculative read request may be directly provided to a memory controller of the processor socket along a speculative path for reduced latency. On this path, the speculative request may be translated into a speculative transaction (block 230). Next the transaction may be arbitrated between on-socket and remote speculative transactions (block 240). The winning transaction is then translated and a speculative memory transaction is allocated to the request (block 250). Then the speculative transaction may be arbitrated with an actual memory transaction (block 260). It may then be determined whether the winning request was the actual transaction (diamond 270). If so, control passes to block 280 (discussed below with regard to FIG. 4). If the speculative request was selected, control instead passes to block 275 (i.e., FIG. 6, discussed below).

Figure 4:
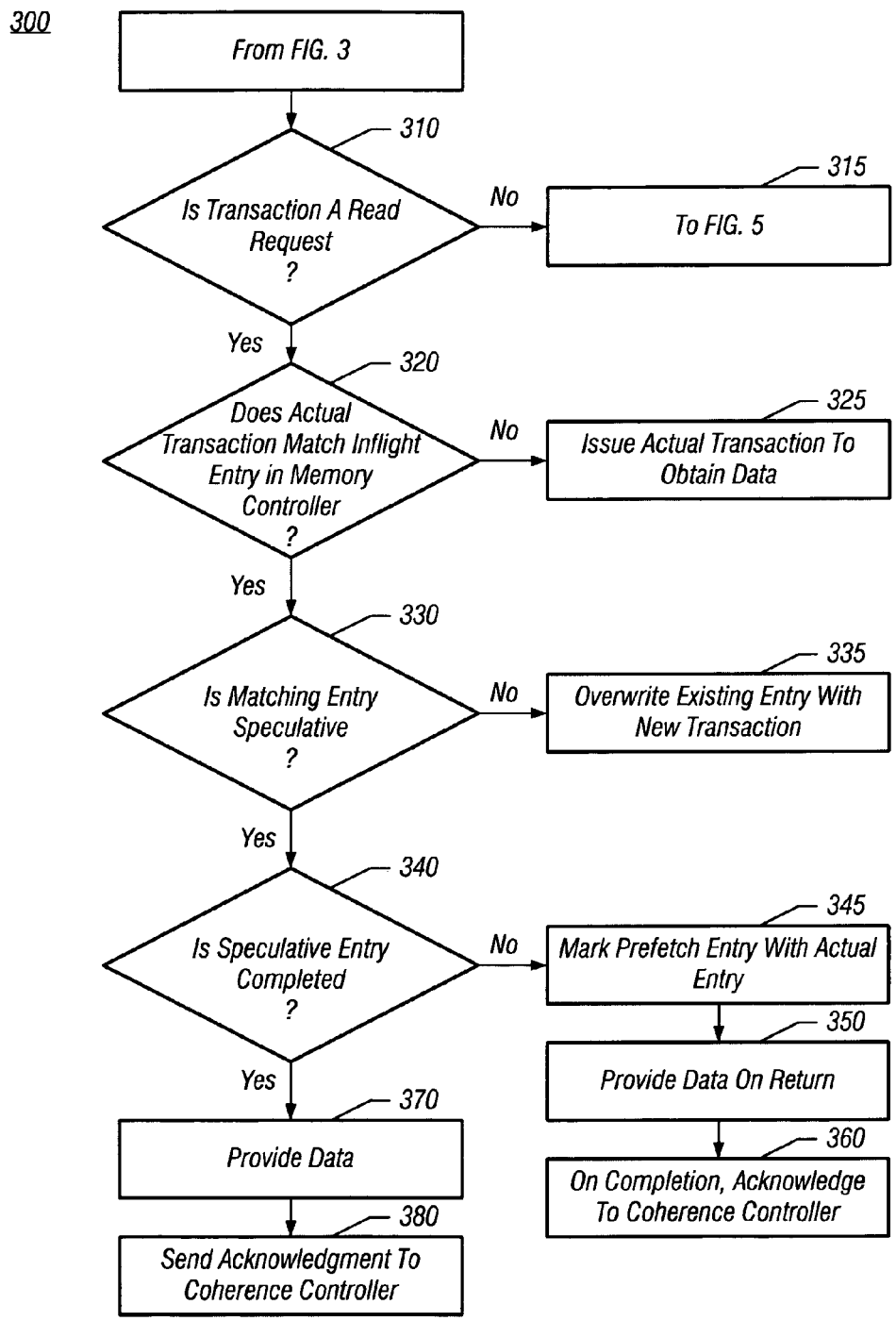
FIG. 4 is a flow diagram of a method of handling actual memory transactions in accordance with one embodiment of the present invention.

Referring now to FIG. 4, shown is a flow diagram of a method of handling actual memory transactions. As shown in FIG. 4, method 300 may begin by determining whether an actual transaction is a read request (block 310). If not, control passes to block 315 (i.e., discussed below with regard to FIG. 5). If the transaction is a read request, control passes to diamond 320, where it is determined whether the transaction matches an inflight entry in the memory controller (diamond 320). If not, control passes to block 325, where the actual transaction is issued (block 325). Otherwise, control passes to diamond 330, where it is determined whether the matching entry is speculative. If the matching entry is not speculative, the existing entry is overwritten with the new transaction (block 335).

Still referring to FIG. 4, if the matching entry is speculative, control passes from diamond 330 to diamond 340. There it may be determined whether the speculative entry has completed (diamond 340). If not, control passes to block 345, where the prefetch entry may be marked with an association to the actual entry. Accordingly, when the data is obtained for the prefetch request, it is provided for the actual read transaction entry with which it is marked (block 350). Upon completion of the read request, an acknowledgment is provided to the coherence controller (block 360).

Referring still to FIG. 4, if instead at diamond 340 it is determined that the speculative entry has already completed, the obtained data may be provided for the actual read transaction (block 370). Further, an acknowledgment to the coherence controller for the completed transaction may be sent (block 380). While described with this particular implementation in the embodiment of FIG. 4, it is to be understood that the scope of the present invention is not so limited.

Figure 5:
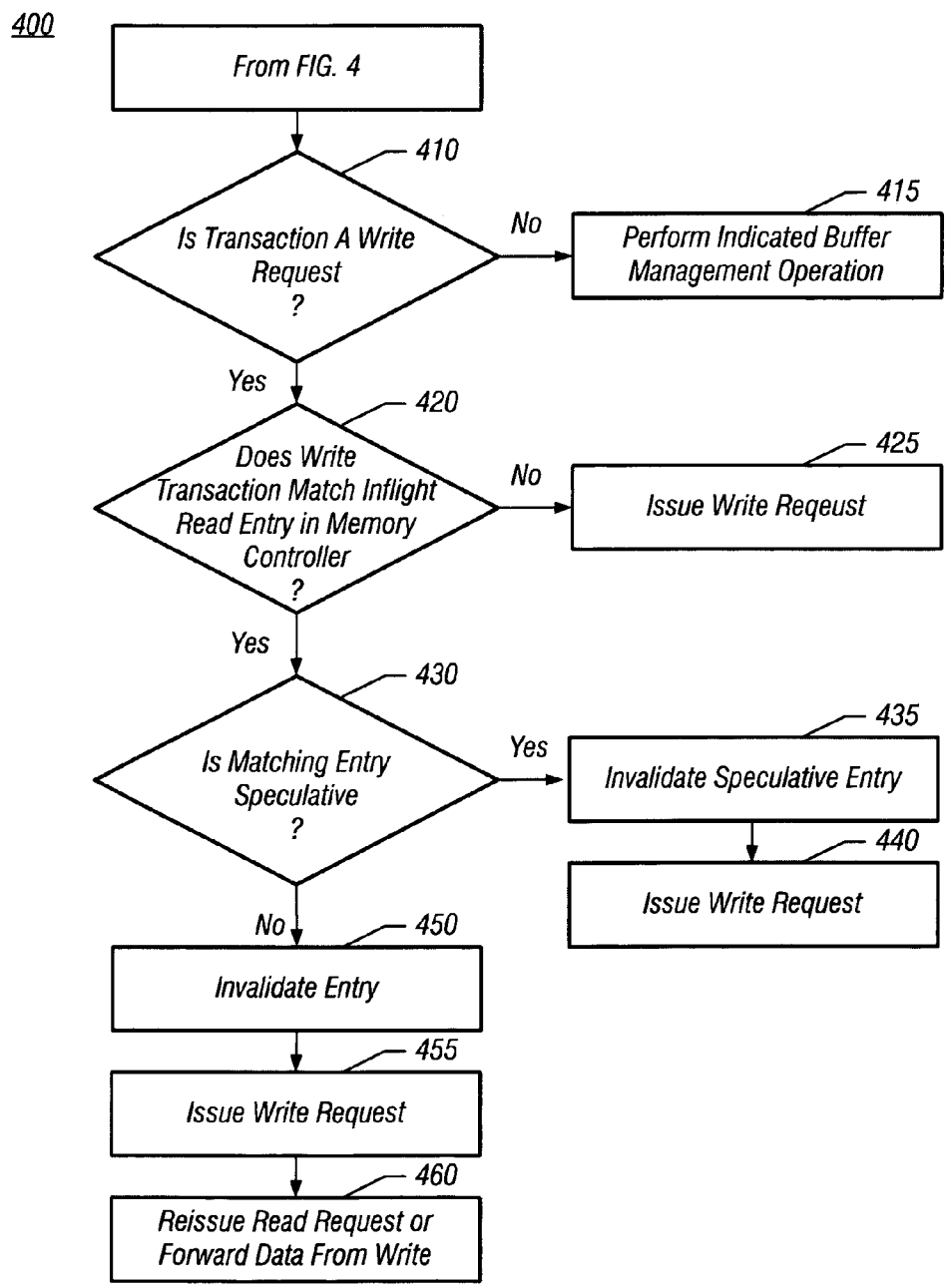
FIG. 5 is a flow diagram of a method of handling write requests in accordance with an embodiment of the present invention.

Referring now to FIG. 5, shown is a flow diagram of a method of handling write requests in accordance with an embodiment of the present invention. As shown in FIG. 5, method 400 may begin by determining whether an incoming transaction is a write request (diamond 410). If not, control passes to block 415 to perform an indicated buffer management operation that corresponds to the transaction. If instead the transaction is a write request, control passes to diamond 420. There it may be determined whether the write transaction matches an inflight read entry in the memory controller (diamond 420). If not, the write request may be issued (block 425). Otherwise, control passes to diamond 430, where it may be determined whether the matching entry is speculative (diamond 430). If the matching entry is speculative, control passes to block 435, where the speculative entry is invalidated. Then, control passes to block 440, where the write request is issued.

Still referring to FIG. 5, if instead control passes from diamond 430 to block 450, the actual read transaction entry that matches the write transaction may be invalidated (block 450). Next, the write request may be issued (block 455). Finally, when the write request is completed, the previously invalidated read request may be reissued, or data from the write transaction may be forwarded in its place (block 460). While described with this particular implementation in the embodiment of FIG. 5, it is to be understood that the scope of the present invention is not limited this regard.

Figure 6:
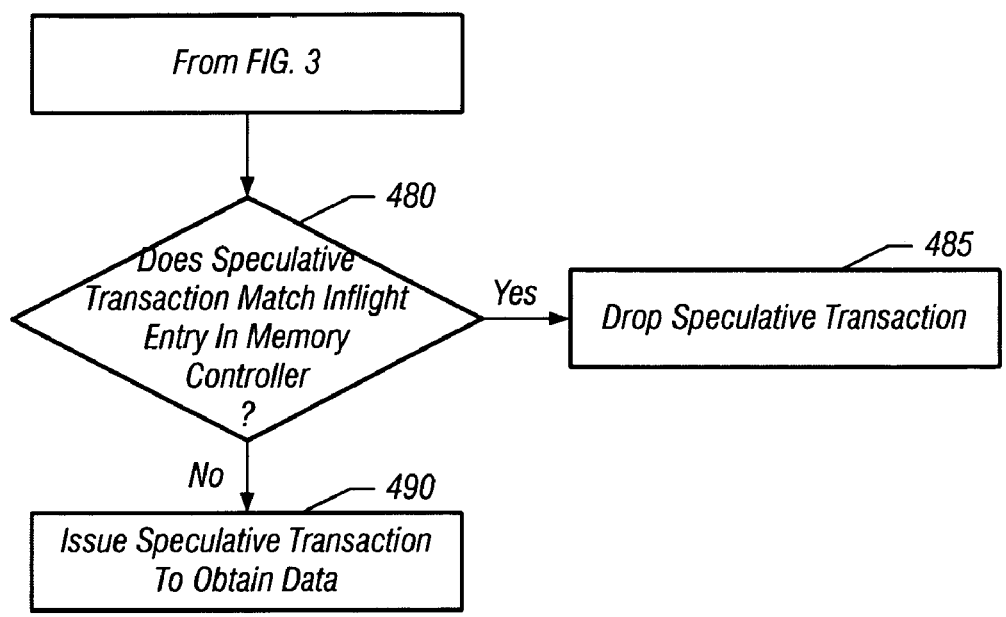
FIG. 6 is a flow diagram of a method of handling a speculative transaction in accordance with one embodiment of the present invention.

Referring now to FIG. 6, shown is a flow diagram of a method of handling a speculative transaction in accordance with one embodiment of the present invention. As shown in FIG. 6, method 475 may begin by determining whether the speculative transaction matches an inflight entry in the memory controller (diamond 480). If so, the speculative transaction may be dropped (block 485). If the speculative transaction does not match an inflight entry, control passes from diamond 480 to block 490. There, the speculative transaction may be issued (e.g., out of the memory controller) to obtain the data (block 490). Of course while described with this manner in the embodiment of FIG. 6, it is to be understood that speculative transactions may be handled in other ways in different embodiments.

Figure 7:
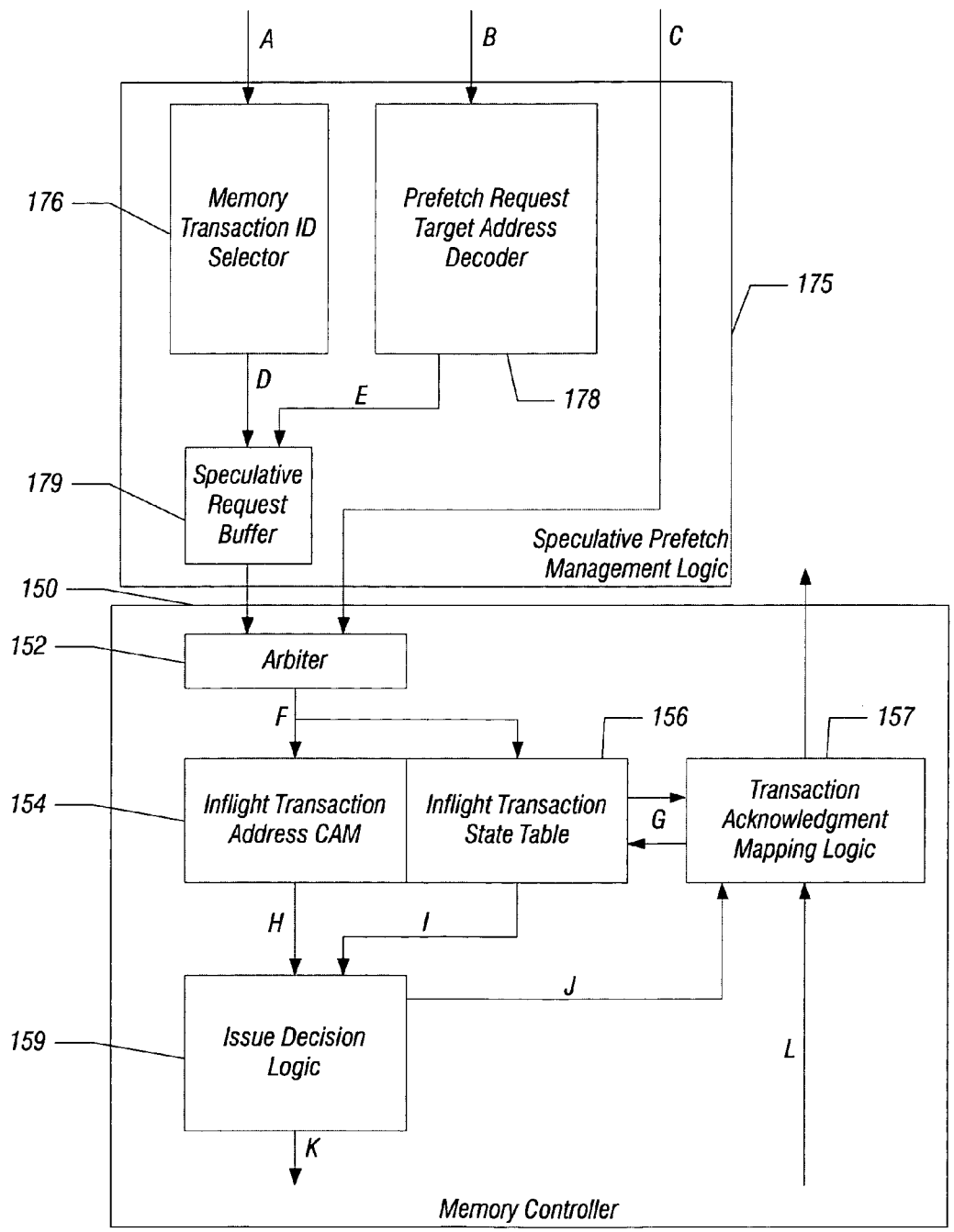
FIG. 7 is a block diagram of speculative prefetch management logic and a memory controller in accordance with one embodiment of the present invention.

As described above, different circuitry may be implemented to handle speculative and actual transactions in different embodiments. Referring now to FIG. 7, shown is a block diagram of a speculative prefetch management logic and a memory controller in accordance with one embodiment of the present invention. As shown in FIG. 7, speculative prefetch logic 175 may include a memory transaction identifier selector (selector) 176, a prefetch request target address decoder (decoder) 178, and a speculative request buffer 179. Selector 176 may receive incoming prefetch transactions as early indicators via a line A. When a new prefetch request is received, speculative management logic 175 may first allocate a read-write buffer to it from a reserved list via selector 176. In some embodiments, this allocation can be based on two schemes: selection of the oldest (least recently used) read-write buffer available or selection of the first available based on a round robin scheme. In turn, selector 176 may issue a valid speculative request along with an associated request identifier along a line D to speculative request buffer 179. Similarly, decoder 178 is coupled to receive incoming system addresses on a line B and provide a speculative prefetch address corresponding to the speculative transaction along a line E to speculative request buffer 179. Once a read-write buffer is assigned, that buffer is locked until the entire transaction has completed. If the transaction has been allocated a buffer, then the resulting transaction information may be stored in speculative request buffer 179 to handle arbitration between regular read requests and speculative read requests in the issue path. Normal memory access requests may be given priority, so if speculative request buffer 179 is full or no buffer is available in the reserved list, then the prefetch request may be dropped.

Note that speculative prefetch logic 175 is further coupled to receive actual memory requests incoming from a coherence controller and pass them through along a line C to a memory controller 150. Accordingly, memory controller 150 is coupled to receive actual and speculative memory requests in arbiter 152. The winning transaction is provided on a line F to an inflight transaction address (ITA) content addressable memory (CAM) 154 and an inflight transaction state (ITS) table 156. Addresses of new memory access transactions passed by arbiter 152 may be CAM-ed against the addresses in ITA CAM 154. The CAM hit vector is then used to index into ITS table 156.

Based on whether the incoming transaction matches an entry already present in ITA CAM 154, certain information is provided along lines H and I to an issue decision logic 159 that may, based on the incoming information, choose to issue the transaction out to memory along a line K. In the embodiment of FIG. 7, the information read out from ITS table 155 and a hit vector of ITA CAM 154 may be used by issue decision logic 159 to decide whether to issue the transaction to the memory. Such a decision may correspond to the methods described above with regard to FIGS. 4-6, for example.

In turn, information may be shared between ITS table 156 and a transaction acknowledgment mapping logic (mapping logic) 157, which is further coupled to receive information from issue decision logic 159 along line J. Still further, mapping logic 157 is further coupled to receive incoming acknowledgment information along a line L. Based on the information received, mapping logic 157 sends an acknowledgment code out to the proper location. Mapping logic 157 may map incoming acknowledgements for accesses sent to memory according to various rules. For example, in one embodiment the following rules may be applied. First, mapping logic 157 reads ITS table 156 using the identifier of the acknowledgment to determine if it is a speculative prefetch. If it is a speculative prefetch, and if the acknowledgement indicates that the transaction was error free and there is a matching normal transaction, then the acknowledgement is forwarded as the acknowledgement for the matching normal transaction. Otherwise, the corresponding prefetch entry is marked as not pending in ITS table 156. If an error is indicated for the speculative transaction and there is a matching normal transaction, the acknowledgement is forwarded as an error acknowledgement for the matching normal transaction. Otherwise, the corresponding prefetch entry is invalidated in ITS table 156. If the acknowledgment is not of a speculative transaction, the acknowledgement is forwarded without any modification. If there was an inflight match to a speculative access, then the corresponding speculative entry is invalidated.

With reference back FIG. 4, if there is a CAM match and the matching transaction is any of an inflight/complete write, an inflight/complete read, or an (earlier) speculative read, the speculative request may be dropped. Otherwise, the request may be issued and an entry made into ITA CAM 154, marking it as valid, speculative and pending. If instead the request is a normal memory write, and there is a CAM match to a speculative prefetch transaction, and the corresponding transaction is still inflight, the speculative read request entry may be invalidated and the write issued. If there is a CAM match and the corresponding transaction is complete, the entry may be invalidated and the coherence controller request may proceed. Otherwise, if there is no CAM match, the normal write request may go ahead. Note that in such cases, the write is allowed to go ahead, and the corresponding entry is written in ITA CAM 154 and ITS table 156, and the entry will be marked as valid and not speculative and pending.

If the request is a normal memory read, and there is a CAM match to a speculative prefetch read transaction, and the speculative prefetch is still inflight, then the normal request's transaction identifier may be written into a "matching_id" field in the matching entry of ITS table 156 and a "match_vld" field may be set for that entry. Further, the speculative prefetch's identifier may be written into the "matching_id" field in the entry corresponding to the normal request's id and the corresponding "match_vld" bit set. Then memory controller 150 may send an indication to map the speculative transaction return data to the matched normal request's identifier. Thus, when the data arrives from memory, it is written into the read data buffer entry corresponding to the matching normal transaction identifier and the matching normal request, and the transaction is acknowledged to coherence controller 140. If instead the speculative prefetch has already completed, the normal request's transaction identifier may be written into the "matching_id" field in the entry of ITS table 156 which matched and the "match_vld" field set for that entry. The speculative prefetch's identifier may be written into the "matching_id" field in the entry corresponding to the normal request's id and the corresponding "match_vld" bit set. Mapping logic 157 may send an acknowledgment for the transaction indicating that the transaction has completed the data is available in the read data buffer.

If instead there is a CAM match to a normal transaction entry which is still valid, the existing entry may then be overwritten with the new transaction. Finally, if there is no CAM match, the read request may be issued and a corresponding entry in ITA CAM 154 and ITS table 156 written. The entry will be marked as valid (not speculative and pending). Note that if the request is a normal request and is a buffer management command (e.g., read from a buffer, move data around in buffers), then the ITS table entry of the buffer may be read. If the entry has its "match_vld" bit set, the transaction may be issued to the memory controller with the read data buffer access id replaced with the "matching_id" value.

Note that an entry in ITA CAM 154 and ITS table 156 is available for allocation to a new prefetch request if no speculative prefetch has used it yet, or if a speculative prefetch has been invalidated, or if speculative prefetch has matched a normal request while it was still inflight and the acknowledgement for the prefetch transaction has come back. Entries are further available for completed speculative prefetches with no matching normal request, or if a speculative prefetch has completed and has matched a normal request and the matched normal request also has completed.

While shown with this particular implementation in the embodiment of FIG. 7, it is to be understood that different implementations are possible and further that memory controller 150 may include additional components, such as read and write buffers and other associated structures.

Figure 8:
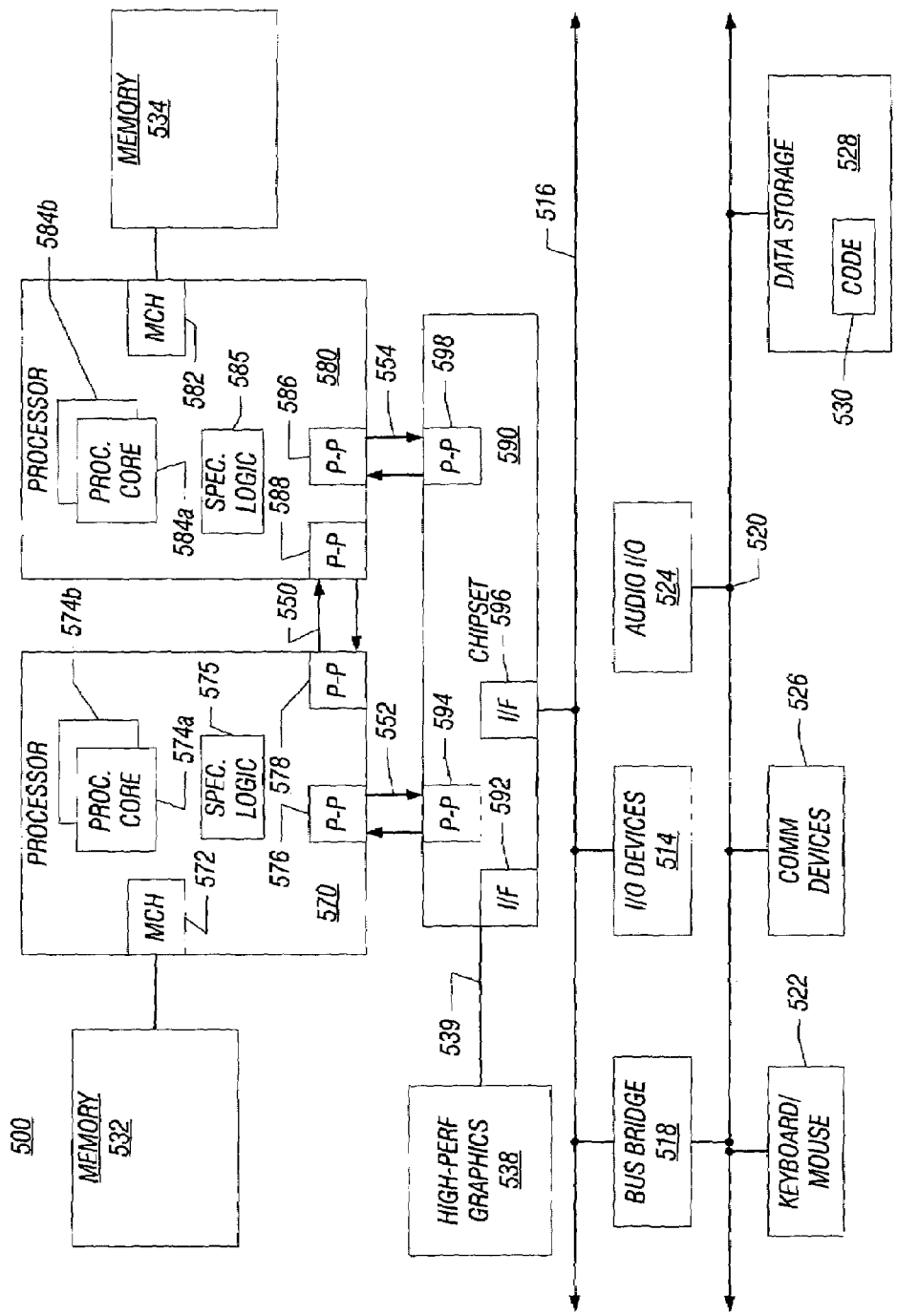
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 500 is a point-to-point interconnect system, and includes a first processor 570 and a second processor 580 coupled via a point-to-point interconnect 550. As shown in FIG. 8, each of processors 570 and 580 may be multicore processors, including first and second processor cores (i.e., processor cores 574a and 574b and processor cores 584a and 584b).

Each of processors 570 and 580 may further include speculative logic 575 and 585. Speculative logic 575 and 585 may be used to directly generate and provide speculative requests to a corresponding memory controller hub (MCH) 572 and 582. In this way, speculative transactions corresponding to actual read requests may be sent out of processors 570 and 580 in parallel with the coherency determinations made for such actual read requests within processors 570 and 580.

First processor 570 further includes point-to-point (P-P) interfaces 576 and 578. Similarly, second processor 580 includes P-P interfaces 586 and 588. As shown in FIG. 8, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 8, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as a PCI Express™ bus or another third generation input/output (I/O) interconnect bus, although the scope of the present invention is not so limited.

As shown in FIG. 8, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 8, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor socket comprising:
   at least one processor core to generate a read request;
   a coherent path to receive the read request and to determine coherency of the read request and route the read request to a memory controller of the processor core, the coherent path comprising a router, and a coherence controller coupled to the router, wherein the router is to route the read request to a different processor socket or the coherence controller based on an address of the read request; and
   a bypass path to provide a speculative request corresponding to the read request to the memory controller independently of the coherent path, the bypass path comprising a speculative router, and speculative management logic to provide the speculative request to the memory controller if a transaction level of the memory controller is less than a threshold and to drop the speculative request if the transaction level is greater than the threshold, wherein the speculative router is to route the speculative request to a different processor socket or the speculative management logic based on an address of the speculative request, wherein the speculative management logic includes a transaction identifier selector to receive an incoming prefetch transaction, allocate a read-write buffer and generate a valid prefetch request, a prefetch target address decoder to receive a system address and generate a speculative prefetch address corresponding to the valid prefetch request, and a speculative request buffer to receive the valid prefetch request and the speculative prefetch address and to provide a speculative request to the memory controller, and a bypass path to provide actual memory requests to the memory controller.

2. The processor socket of claim 1, wherein the speculative router is to route the speculative request to the different processor socket along a route that is to bypass the router.

3. The processor socket of claim 1, wherein the bypass path is to drop the speculative request based on a transaction level of the coherent path.

4. The processor socket of claim 1, wherein the memory controller is to determine if the read request received from the coherent path corresponds to an entry in the memory controller for a previous speculative request.

5. The processor socket of claim 4, wherein the memory controller is to provide data in the entry to the at least one processor core if the read request corresponds to the entry and the read request is coherent.

6. The processor socket of claim 1, wherein the memory controller is to arbitrate between read requests and speculative requests and to allow the speculative requests to issue when the memory controller is not fully loaded.

7. The processor socket of claim 1, wherein the bypass path comprises a lower latency path to the memory controller than the coherent path.

8. The processor socket of claim 1, wherein the memory controller includes an arbiter to receive the valid prefetch request and the actual memory result and to provide an arbiter output to an inflight transaction address content addressable memory and an inflight transaction state table, the inflight transaction address content addressable memory to generate a hit vector if the arbiter output matches an entry in the inflight transaction address content addressable memory, the hit vector to index into the inflight transaction state table, and an issue decision logic to issue a transaction to a memory coupled to the memory controller responsive to the hit vector and an output of the inflight transaction state table.

* * * * *

UNITED STATES PATENT AND TRADEMARK OFFICE
CERTIFICATE OF CORRECTION

PATENT NO.        : 7,600,078 B1                    Page 1 of 1
APPLICATION NO.   : 11/392335
DATED             : October 6, 2009
INVENTOR(S)       : Cen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 708 days.

Signed and Sealed this

Fifth Day of October, 2010

David J. Kappos
*Director of the United States Patent and Trademark Office*